United States Patent
Snow et al.

(10) Patent No.: US 9,229,773 B1
(45) Date of Patent: Jan. 5, 2016

(54) DETERMINING WHEN TO PERFORM A MAINTENANCE OPERATION ON A COMPUTING DEVICE BASED ON STATUS OF A CURRENTLY RUNNING PROCESS OR APPLICATION ON THE COMPUTING DEVICE

(75) Inventors: Michael Max Snow, Cedar Hills, UT (US); Paul Byron Hillyard, Lindon, UT (US)

(73) Assignee: Crimson Corporation, Dover, DE (US)

( * ) Notice: Subject to any disclaimer, the term of this patent is extended or adjusted under 35 U.S.C. 154(b) by 847 days.

(21) Appl. No.: 12/827,051

(22) Filed: Jun. 30, 2010

(51) Int. Cl.
*G06F 9/46* (2006.01)
*G06F 3/048* (2013.01)
*G06F 9/48* (2006.01)
*G06F 9/50* (2006.01)
G06F 9/54 (2006.01)
G06F 9/445 (2006.01)
G06F 21/84 (2013.01)

(52) U.S. Cl.
CPC ............ *G06F 9/4881* (2013.01); *G06F 9/5005* (2013.01); *G06F 8/67* (2013.01); *G06F 9/542* (2013.01); *G06F 21/84* (2013.01)

(58) Field of Classification Search
CPC ............................ G06F 9/4843; G06F 9/4881
See application file for complete search history.

(56) References Cited

U.S. PATENT DOCUMENTS

| | | | |
|---|---|---|---|
| 7,376,911 B2 * | 5/2008 | Brown | 715/802 |
| 8,146,013 B2 * | 3/2012 | Bhogal et al. | 715/808 |
| 8,321,554 B2 * | 11/2012 | Dickinson | 709/224 |
| 2004/0061716 A1 * | 4/2004 | Cheung et al. | 345/710 |
| 2004/0068627 A1 * | 4/2004 | Sechrest et al. | 711/158 |
| 2004/0189712 A1 * | 9/2004 | Rundell | 345/808 |
| 2005/0080848 A1 * | 4/2005 | Shah | 709/204 |
| 2006/0026212 A1 * | 2/2006 | Tsukerman et al. | 707/200 |
| 2006/0195844 A1 * | 8/2006 | Jalobeanu | 718/102 |
| 2007/0011626 A1 * | 1/2007 | Castaneda | 715/867 |
| 2007/0016867 A1 * | 1/2007 | Nickell et al. | 715/730 |
| 2007/0043974 A1 * | 2/2007 | LeBlanc et al. | 714/23 |
| 2008/0178186 A1 * | 7/2008 | Capek et al. | 718/103 |
| 2008/0189652 A1 * | 8/2008 | Brown | 715/788 |

* cited by examiner

*Primary Examiner* — Abdullah Al Kawsar
(74) *Attorney, Agent, or Firm* — Austin Rapp & Hardman

(57) ABSTRACT

A method for determining when to perform an operation on a computing device is described. The computing device receives a direction to perform an operation. A deferral configuration including at least one criterion is also received. The computing device determines whether a criterion is met and defers performance of the operation if it is met. The computing device performs the operation if a criterion is not met.

11 Claims, 15 Drawing Sheets

US 9,229,773 B1

DETERMINING WHEN TO PERFORM A MAINTENANCE OPERATION ON A COMPUTING DEVICE BASED ON STATUS OF A CURRENTLY RUNNING PROCESS OR APPLICATION ON THE COMPUTING DEVICE

TECHNICAL FIELD

The present disclosure relates generally to computers and computer-related technology. More specifically, the present disclosure relates to determining when to perform an operation on a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. On a network, one or more servers may provide data, services and/or may be responsible for managing other computers. The managed computers are often referred to as nodes. A computer network may have hundreds or even thousands of managed nodes.

Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, problems with computer hardware may arise at times. In addition, computer hardware is often upgraded and replaced with new components. Similarly, computer software is also frequently upgraded or replaced. New computer hardware and software is continually being integrated into systems across the world. Furthermore, computer systems may need to be scanned in order to detect and mitigate security threats.

Often, end-user issues may arise when a computing device is in need of performing maintenance or some other operation but also needs the use of system resources to accomplish an important objective, such as running a critical application or displaying a presentation. For example, if an end user's presentation to a large group of people is interrupted or slowed by an operating system update, the end user may be frustrated or disappointed with his computer's performance.

As shown from the above discussion, there is a need for systems and methods that will improve the ability to manage and support computer systems while avoiding or managing interruptions or performance degradations with an end user's computer use. Improved systems and methods may enable a person performing computer support to meet system maintenance needs while satisfying the end-user's need for system resources to meet their objectives.

DETAILED DESCRIPTION

Figure 1:
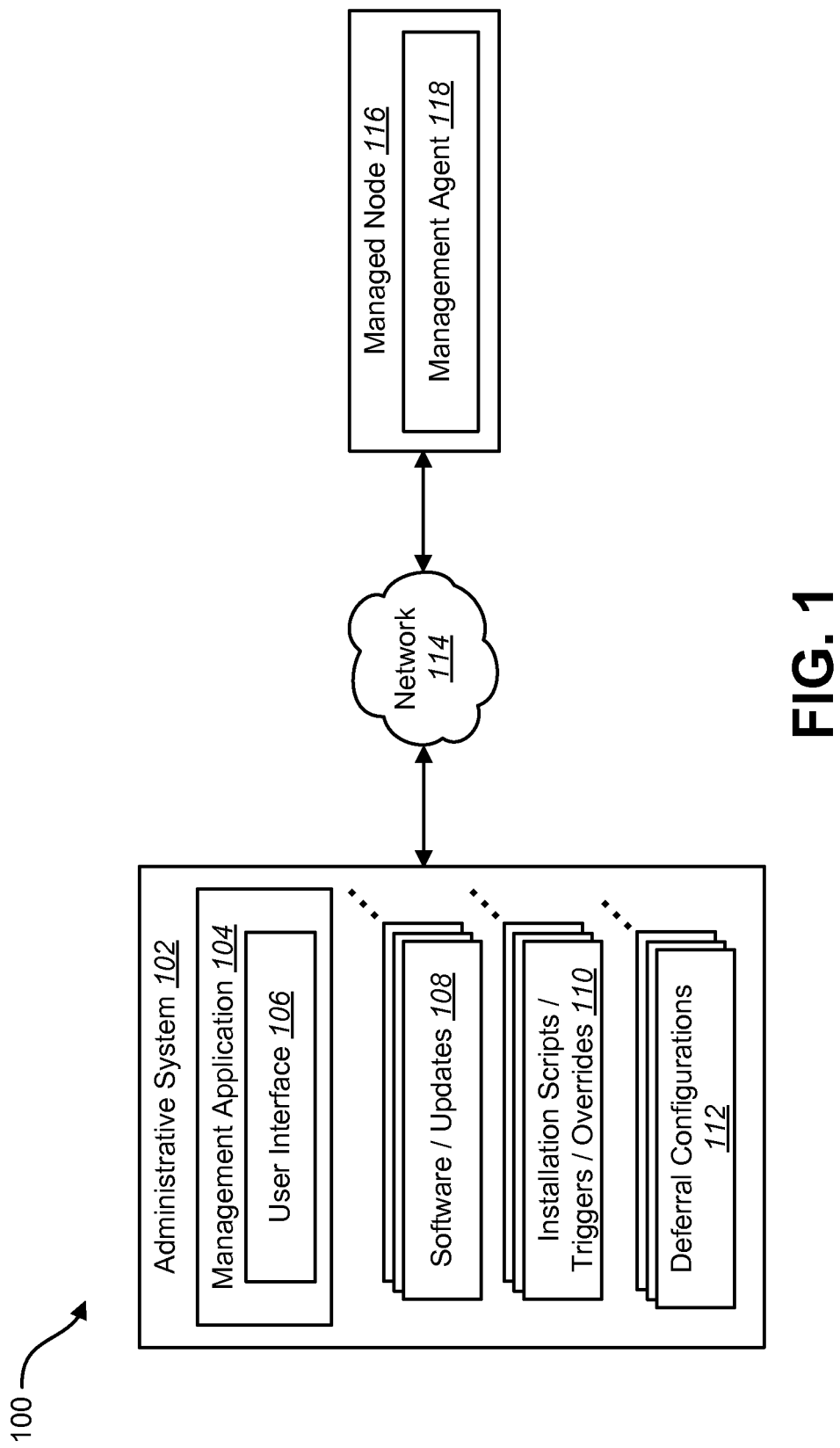
FIG. 1 is a block diagram that illustrates one configuration of a managed network in which a system for determining when to perform operations on a computing device may be implemented.

Many computers now perform a variety of automated operations (e.g., the end user does not explicitly start the operation). For example, operating system updates or software updates are sometimes automatic. The systems and methods disclosed herein help manage these kinds of operations to minimize or at least lessen the likelihood that such operations will negatively affect an end user's computer activities.

Often, a computing device may need to perform an operation (e.g., install software, display a message, etc.) or be in need of maintenance (e.g., installing a software patch, uninstalling harmful or unauthorized software, etc.) but may also need to perform another task (e.g., perform presentation functions, perform video conferencing functions, run an important application, etc.). These tasks may include interactions with corporate customers or groups of users where the priority of the task being performed on the computing device is greater than the priority of remediating a system vulnerability or prompting a user (e.g., to allow patch installation or reboot). There may be many applications that should not be slowed or interrupted by performing maintenance operations or even by prompting to perform a maintenance operation. Some examples when slowing or interrupting activities on a computing device should be avoided include when the computing device is currently running WebEx™ (i.e., conferencing software), currently showing a full-screen video presentation from a DVD, or running other third party software of concern, etc. The list of examples may be potentially large, yet difficult to identify and automatically handle ahead of time (e.g., program into maintenance software). Thus, systems and methods that allow identifying applications or device activities that should not be slowed or interrupted may be beneficial.

Simply checking for the existence of such applications or activities may not be enough, however. It may often be beneficial to consider what state the application or device is in. For example, an application may simply be running in the background while a user is not actually using it. Or, a presentation application may be in the foreground, but the user may just be working on a presentation, but not actually presenting to others.

Systems and methods for determining when to perform certain operations on a computing device are disclosed. One example of one such operation is a maintenance operation. Since maintenance operations may slow or even interrupt activities occurring on the computing device, these systems and methods may enhance centralized control of when maintenance operations are performed. This can be accomplished by assessing activity occurring on the computing device. Thus, the needs of a computing device user may be balanced with the needs of computer support personnel to provide maintenance for that computing device.

Software that performs maintenance operations may often be seen in a negative light by some users. Although such software may be valued by computer support personnel, the user's experience in encountering the software may only be when the software slows or even interrupts activities to perform maintenance (e.g., patching) on the user's computing device. By reducing the impact this software may cause on the computing device, the user experience may be improved. This way, computer support personnel may have more confidence when using software to perform maintenance during the day when quicker feedback may be had or when system vulnerabilities may be mitigated more rapidly, and yet still avoid possibly slowing or interrupting important actions that users may be paid to perform.

A method for determining when to perform an operation on a computing device is disclosed. The method includes receiving a direction to perform an operation on a computing device, receiving a deferral configuration that includes at least one criterion and determining whether the criterion is met. Performance of the operation is deferred on the computing device if the criterion is met. The operation is performed if the criterion is not met.

The deferral configuration may include multiple criteria that define multiple conditions as to when performance of the operation is to be deferred. The criterion may include a name of a running process, a name of a running application or a name of a running process or application having a foreground user interface window.

The deferral configuration may be configurable to add or delete process or application names and to add or delete one or more criteria. At least one criterion may be when a process or application is associated with a foreground user interface window, the foreground user interface window includes a specified caption or class and a name of the process or application is on a list of process or application names.

The criterion may be when a process or application is associated with a foreground user interface window, the foreground user interface window occupies at least an entire allowable client area and a name of the process or application is on a list of process or application names. The criterion may be when a process or application is associated with a foreground user interface window, the foreground user interface window occupies at least an entire allowable client area on at least one virtual desktop and a name of the process or application is on a list of process or application names.

The criterion may be when a process or application is associated with a user interface window that has a property indicating that the user interface window is maximized and a name of the process or application is on a list of process or application names. The criterion may be when a process or application is using a specified hardware device and a name of the process or application is on a list of process or application names.

The criterion may be when a process or application is using a specified amount of CPU resources and a name of the process or application is on a list of process or application names. The criterion may be when a process or application has loaded a specified software control and a name of the process or application is on a list of process or application names. The operation may be a maintenance operation.

A computing device that is configured for determining when to perform an operation is also disclosed. The computing device includes a processor and instructions stored in memory. The computing device receives a direction to perform an operation and a deferral configuration that includes at least one criterion. The computing device determines whether the at least one criterion is met and defers performance of the operation if the criterion is met. The computing device performs the operation if the criterion is not met.

A computer-readable medium for determining when to perform an operation is also disclosed. The computer-readable medium includes instructions for receiving a direction to perform an operation, receiving a deferral configuration that includes at least one criterion and determining whether the criterion is met. Instructions are also included for deferring performance of the operation if the criterion is met and performing the operation if the criterion is not met.

Various configurations are now described with reference to the Figures, where like reference numbers may indicate identical or functionally similar elements. The present systems and methods, as generally described and illustrated in the Figures herein, could be arranged and designed in a wide variety of different configurations. Thus, the following more detailed description of several configurations of the present systems and methods, as represented in the Figures, is not intended to limit the scope of the systems and methods, as claimed, but is merely representative of the configurations of the systems and methods.

FIG. 1 is a block diagram that illustrates one configuration of a managed network in which a system 100 for determining when to perform operations on a computing device may be implemented. An administrative system 102 is connected to a computer network 114, such as a Local Area Network (LAN) or the Internet. The administrative system 102 is used to manage node(s) 116 that are also connected to the computer network 114. These other node(s) 116 will be referred to herein as "managed nodes" or "nodes." For simplicity, a single managed node 116 is shown in the system 100 of FIG. 1. Other configurations of the system 100, however, may include many managed nodes 116.

The administrative system 102 may include a management application 104. The management application 104 may include a user interface 106. The administrative system 102 may also include software or one or more updates 108 as well as one or more installation scripts, triggers or overrides 110.

The administrative system may also include one or more deferral configurations 112. The managed node(s) 116 may include a management agent 118. The management agent 118, for example, is software used to perform management tasks on the managed node 118. The deferral configurations 112 may be saved in a particular "scan and repair" setting associated with the management agent 118. The deferral configurations 112 may comprise data, instructions, or both. For example, a deferral configuration 112 is a configuration file stored on the administrative system 102 or elsewhere on the network 114. The deferral configurations 112 may comprise several criteria that define several conditions as to when to defer performing an operation. The deferral configurations could be stored as an XML file, executable file, or other file type.

The management application 104 may manage the managed node(s) 116. For example, the user interface 106 provides an interface for computer support personnel to manage the managed node(s) 116. The software or updates 108 may be computer programs or updates used to maintain or update managed node(s) 116. An update 108 can be a software patch or upgrade, for example. The software or updates 108 may be stored on the administrative system 102, or on another network node. For example, the software or updates 108 could be stored on an intranet 114 server, or on a computing device connected to the Internet 114.

The installation scripts, triggers, or overrides 110 may be software, data, or both. Installation scripts 110 may be used to instruct managed node(s) 116 via the management agent 118 to install or uninstall software or updates 108. Triggers 110 may be used to instruct the management agent 118 on when to run or execute. Overrides 110 may be used to instruct the management agent 118 to perform an action regardless of whether or not the managed node 116 was recently scanned or rebooted, or regardless of whether any deferral criteria may be met. The deferral configurations 112 may include data, instructions, or both used to cause the management agent 118 to defer performing a maintenance operation on the managed node 116 when certain criteria are met. Users or computer support personnel may modify, add or delete deferral configurations 112.

Figure 2:
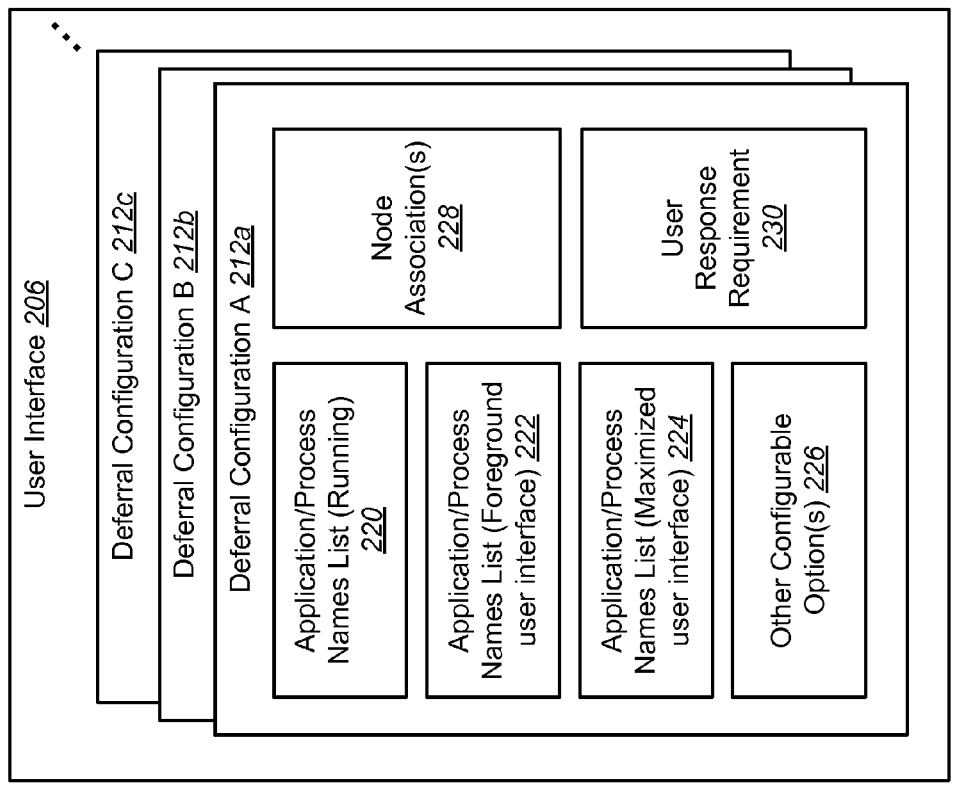
FIG. 2 is a block diagram that illustrates one configuration of a user interface.

FIG. 2 is a block diagram that illustrates one configuration of a user interface 206. Users or computer support personnel may use the user interface 206 to configure (e.g., modify, add or delete) deferral configurations 212a-c. Although three deferral configurations 212a-c are shown, many deferral configurations 212 may be included. A deferral configuration 212a-c may include several configurable lists of application or process names 220, 222, 224. A deferral configuration 212a-c may also include other configurable option(s) 226. Each configurable list of application or process names 220, 222, 224 (i.e. "names list" herein) may be empty or may include any number of application or process names. The other configurable option(s) 226 may be or include a configurable names list similar to the other names lists 220, 222 and 224. Alternatively, the other configurable option(s) 226 may not be, nor include a names list. The user interface 206 may permit users or computer support personnel to add or delete application or process names from the names lists 220, 222, 224 or other configurable option(s) 226. The user interface 206 may also permit users or computer support personnel to add or delete names lists 220, 222, 224. The user interface 206 may also permit users or computer support personnel to modify, add or delete other configurable option(s) 226. The user interface 206 may also include other configurable items.

Each configurable names list 220, 222, 224, or other configurable option(s) 226 may be associated with configurable deferral criteria. Configurable deferral criteria may be data, instructions, or both indicating when a management agent 118 should not perform a maintenance operation. In one configuration, deferral criteria associated with the running names list 220 requires a management agent 118 to defer performing a maintenance operation when an application or process identified in the running names list 220 is currently running on a managed node 116. For example, if a named financial application is currently running on a managed node 116, the management agent 118 defers performing a maintenance operation.

In another configuration, deferral criteria requires a management agent 118 to defer performing a maintenance operation when a named application or process owns a user interface that is currently displayed in the foreground on a managed node 116. For example, if Microsoft® Word is named on the foreground user interface names list 222 and is currently displayed in the foreground on a managed node 116, the management agent 118 defers performing a maintenance operation.

In yet another configuration, deferral criteria associated with a maximized user interface names list 224 requires deferral of a maintenance operation if a named application or process has a user interface in the display foreground that occupies a certain amount of displayable area (e.g. of the desktop or a virtual desktop). Alternatively, these deferral criteria could require the management agent 118 to defer performing a maintenance operation when a named application or process is in a "presentation" mode or has a "maximized" user interface in the display foreground. For example, a management agent 118 may defer performing a maintenance operation when Microsoft® PowerPoint® is in "presentation" mode, has its window in the foreground occupying a certain amount of the display or if its window is "maximized" in the foreground.

The configurable deferral criteria associated with other configurable option(s) 226 may require a management agent 118 to defer performing a maintenance operation when a specific criterion is (e.g., or criteria are) met. In one example, the management agent 118 defers a maintenance operation if an application or process named in the configurable option 226 is using a specified hardware device on the managed node 116. In another example, a maintenance operation is deferred if an application or process named in configurable option 226 is using a certain amount of Central Processing Unit (CPU) resources. In one instance, a maintenance operation is deferred according to the configurable option 226 when Microsoft® Visual Studio® is utilizing a specified amount of CPU resources (e.g. possibly indicating that compiling is in progress). Other examples of deferral criteria associated with configurable option 226 may include searching for a "Topmost" style window with a particular caption or class or when a particular application or process has loaded a specified software (e.g., ActiveX®) control or controls.

The user interface 206 may also include a series of checkboxes or a drop-down list. The checkboxes or drop-down lists may be used to set or indicate which deferral criteria is associated with the names lists 220, 222, 224 or other option(s) 226. Alternatively, the application or process names may be in a single list where a series of checkboxes or a drop-down list may be used to set or indicate which application or process name is associated with which criteria.

A deferral configuration 212a may also include node association(s) 228. The node association(s) 228 may indicate which node or group of nodes a deferral configuration 212a applies to. A deferral configuration 212a may apply to a single node, any group of nodes or all of the nodes on the network 114. That is, different managed nodes 116 may be associated with one or more different deferral configurations 212a-c. A particular deferral configuration 212a-c may be a default deferral configuration that any node or group of nodes on the network 114 may use in the absence of a specific node association 228. A particular deferral configuration 212a-c may also be tied to the performance of a specific maintenance operation. For example, even though a deferral configuration 212a has a specific node association 228, that node association 228 may be overridden by a deferral configuration for a specific maintenance operation. That is, a deferral configuration 212a-c may override other deferral configurations on any node or group of nodes in order to perform a specific maintenance operation at repair time. Users or computer support personnel may use the user interface 206 to designate which node(s) a particular deferral configuration 212a-c applies to via the node association 228.

A deferral configuration 212a-c may also include a user response requirement 230. Users or computer support personnel may use the user interface 206 to designate whether or not a user response (e.g., approval) is required before performing a maintenance operation on the managed node 116. If the user response requirement 230 is activated, the management agent 118 may notify the user of a managed node of an imminent maintenance operation or prompt the user of a managed node 116 to allow or deny the performance of a maintenance operation on the managed node 116. Furthermore, the user of a managed node 116 may or may not be prompted to allow the managed node 116 to reboot.

In one example, a user of the managed node 116 is using an application "ABC" that is not on any of the name lists 220, 222, 224. The managed node 116 proceeds to perform a maintenance operation, possibly slowing the managed node's 116 performance, or perhaps even interrupting the user with a reboot. If the user complains to computer support personnel that the managed node 116 should not be slowed or interrupted while running application "ABC," then the administrator may use the user interface 206 to add the application name "ABC" to the running names list 220. The computer support personnel may also designate the user's managed node 116 through the use of the node association 228 such that a maintenance operation will be deferred when "ABC" is running. Thus, the next time the user is using "ABC" and a maintenance operation is pending, the maintenance operation may be deferred or the user prompted before proceeding (e.g. in accordance with the user response requirement 230).

Figure 3:
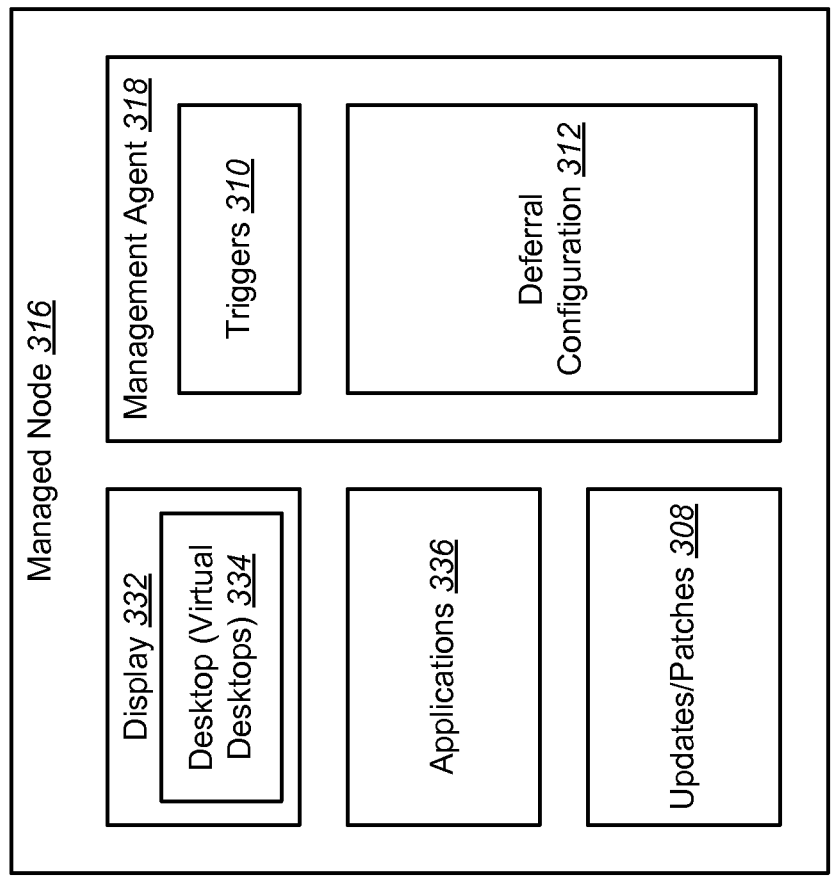
FIG. 3 is a block diagram illustrating one configuration of a managed node.

FIG. 3 is a block diagram illustrating one configuration of a managed node 316. A managed node may include a display 332, application(s) 336, software updates or patches 308, and a management agent 318. The display 332 may be a computer monitor, television, or any other display known in the art. The display 332 may display an Operating System (OS) desktop environment or interface 334. Some examples of operating systems may include Microsoft® Windows®, Macintosh® OS X®, Linux®, Unix®, etc. The desktop environment or interface 334 may comprise a single desktop environment or any number of virtual desktops. Application(s) 336 may include software, a computer program or code that is executed on the managed node 316. The software updates or patches 308 may be software updates to be applied to the application(s) 336 or operating system on the managed node 316. Furthermore, the software updates or patches 308 may be used to fix software errors (e.g., "bugs"), improve application 336 or operating system performance, address security issues on the managed node 316, etc.

The management agent 318 may be a software application or program used to manage the managed node 316. That is, the management agent 318 may perform maintenance operations and provide other functionality. For example, the management agent 318 performs maintenance operations on the managed node 316 as instructed by the administrative system 102. More specifically, the management agent 318 can download and/or install/uninstall application(s) 336 or software updates or patches 308 from the administrative system 102 or from some other intranet or Internet address. The management agent 318 may scan the managed node 316 for application(s) 336 or operating system(s) in need of maintenance (e.g., the application(s) 336 or the operating system(s) are in need of a software update or patch 308). Furthermore, the management agent 318 may scan the managed node 316 for unauthorized application(s) 336, security threats (e.g., viruses, Trojans, worms, malware, spyware, etc.), or other unwanted software (e.g., adware).

The management agent 318 may include trigger(s) 310. The triggers 310 may cause the management agent 318 to perform maintenance operations on the managed node 316. The triggers 310 may be initially included in the management agent 318 or may be downloaded from or modified by the administrative system 102. For example, the triggers 310 are "events" occurring at the managed node. One example of a trigger 310 is receiving an instruction to perform a maintenance operation from the administrative system 102. Other examples of triggers are when the managed node 116 is logged off/on, locked/unlocked, transitioned into/out of screen saver mode or rebooted. Other examples include when a piece of hardware is added or used (e.g., attaching or running a Digital Video Disc (DVD) drive, a Compact Disc (CD) drive, a Universal Serial Bus (USB) thumb drive or when connecting to a network, etc.), when the managed node 116 has an Internet Protocol (IP) address change or when a scheduled time or interval occurs (e.g., a scheduled periodic scan, a time designated by the administrative system 102, etc.).

The management agent 318 may include a deferral configuration 312. The deferral configuration 312 may be initially coded into the management agent 318 or may be downloaded from or modified by the administrative system 102. As discussed above, a deferral configuration may be configurable, allowing the addition, deletion, or modification of name lists 220, 222, 224, or other option(s) 226 with varying deferral criteria.

Figure 4:
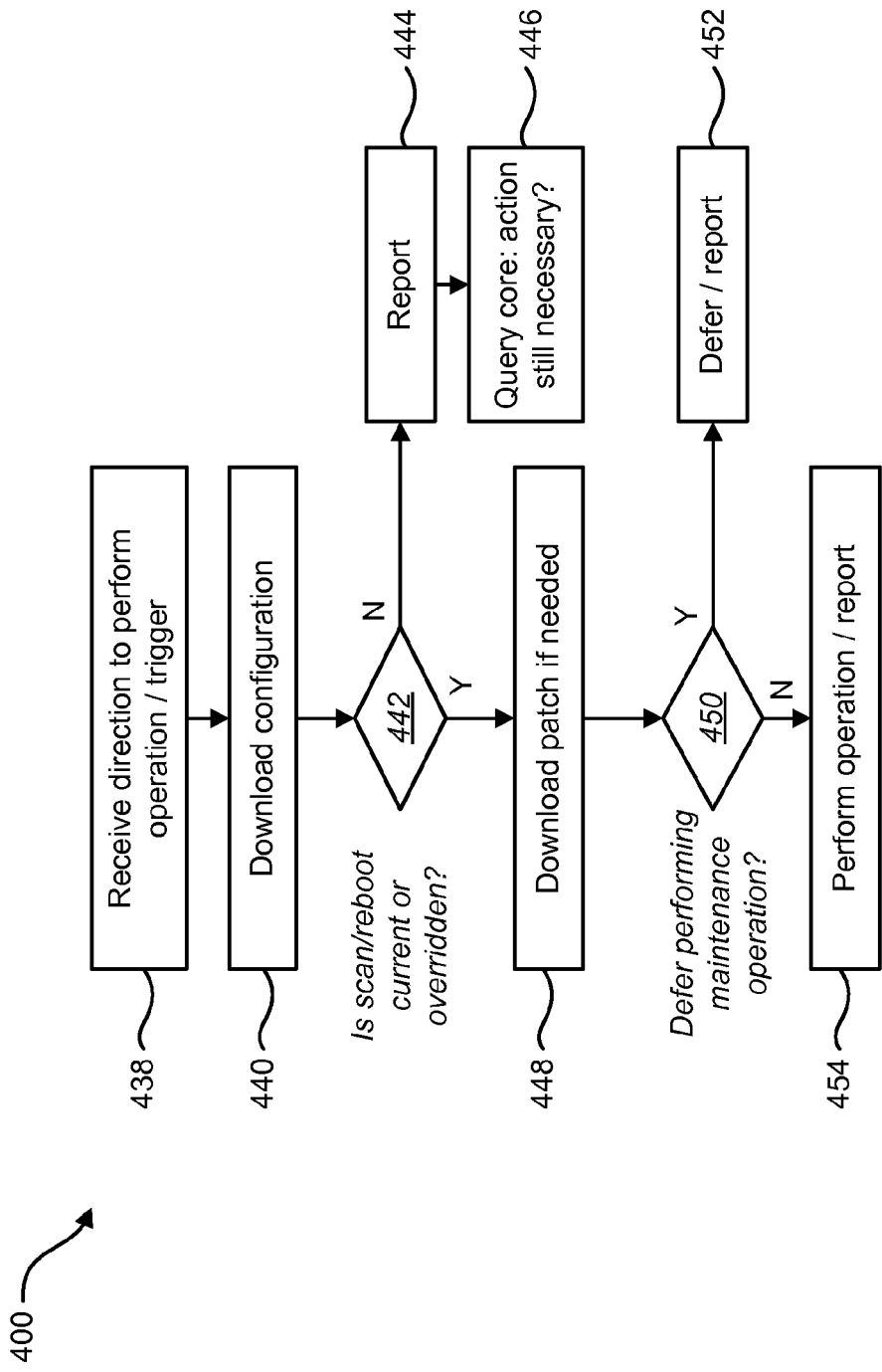
FIG. 4 is a flow diagram illustrating one configuration of a method for determining when to perform an operation on a computing device or managed node.

FIG. 4 is a flow diagram illustrating one configuration of a method 400 for determining when to perform an operation on a computing device or managed node 116. A management agent 118 may receive 438 a direction to perform an operation or a trigger 310 may occur 438. The management agent 118 may download 440 a deferral configuration 312. For example, if the management agent 118 runs, attempts to scan the managed node 316, attempts to repair a vulnerability, or attempts to uninstall a software patch, it may download 440 a deferral configuration 312. The management agent 118 may determine 442 whether a scan or reboot was recently performed and whether a scan or reboot requirement is overridden.

If a scan or reboot was not recently performed and the scan or reboot requirement is not overridden, the management agent 118 may report 444 to the administrative system 102 a reason why a maintenance operation was not performed. For example, a managed node 116 may be instructed either to reboot if necessary (e.g., by checking the managed node 116 state) or to reboot regardless of the managed node 116 state. If the command is to "reboot if necessary," then the managed node 116 may determine whether a reboot is needed (e.g., by checking a managed node 116 registry, etc.). However, if the managed node 116 determines that it should defer rebooting, the managed node 116 may schedule a local task (e.g., to launch itself again to perform the reboot). In one configuration, the scheduled task may be stored in a "volatile" portion of the registry for a Windows operating system. Thus, if the managed node 116 is rebooted for any reason, the scheduled task is lost and will no longer attempt to reboot. Once a scan or reboot has been performed, the management agent 118 may query 446 the administrative system 102 whether the maintenance operation is still needed.

If a scan or reboot was recently performed or the scan or reboot requirement is overridden, the management agent 118 may download 448 a software update or patch if needed. For example, if the desired maintenance operation requires a software update or patch, the software update or patch 308 may be downloaded 448 from the administrative system 102 or other intranet or Internet address. However, if the desired maintenance operation does not require a software update or patch 308 (e.g., an uninstall, a scan, an update rollback, etc.), or if a required software update or patch was previously downloaded, then a software update or patch 308 may not be downloaded 448.

The management agent 118 may determine 450 whether to defer performing a maintenance operation. For example, the management agent 118 may determine whether a particular named process or application is running and whether one or more deferral criteria are met. If the management agent 118 determines 450 that a maintenance operation should be deferred, then the management agent 118 may defer 452 performing a maintenance operation and/or report 452 to the administrative system 102 that the maintenance operation was not performed. The management agent 118 may also report 452 to the administrative system any reason(s) for deferring performance of the maintenance operation. If the management agent 118 determines 450 that the maintenance operation should not be deferred, then the management agent 118 may perform 454 the maintenance operation and/or report 454 to the administrative system 102 that the maintenance operation has been performed. In performing 454 the maintenance operation, the management agent 118 may prompt or notify the user of the managed node 116 according to the user response requirement 230. Alternatively, the management agent 118 may not prompt or notify the user of the managed node 116 according to the user response requirement 230.

Figure 5:
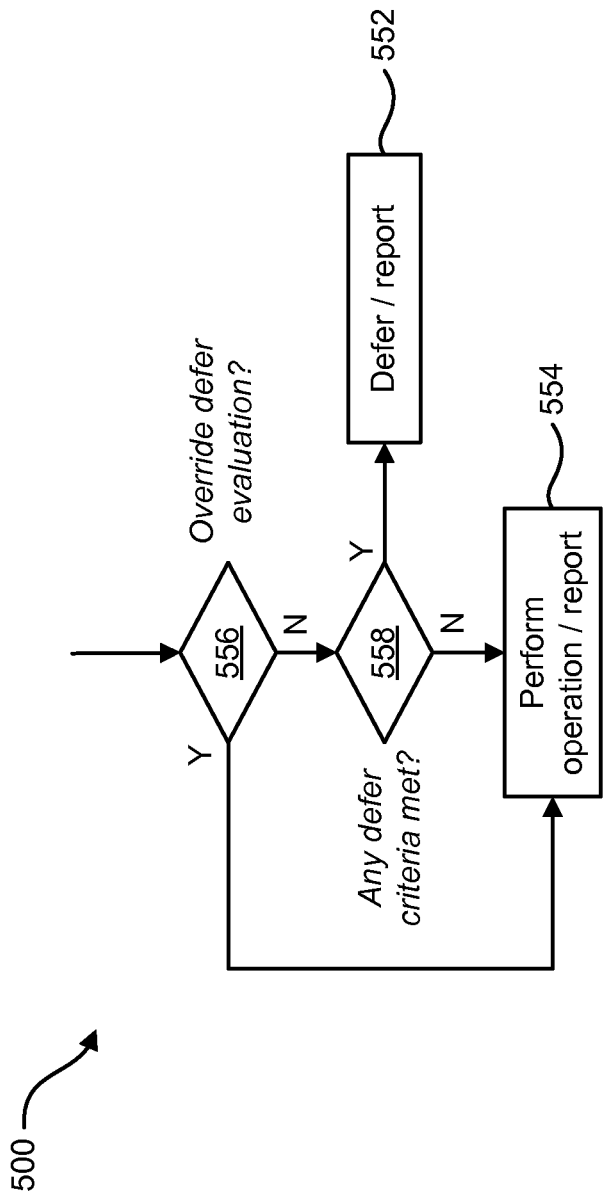
FIG. 5 is a flow diagram that illustrates another configuration of a method for determining when to perform an operation on a computing device or managed node.

FIG. 5 is a flow diagram that illustrates another configuration of a method 500 for determining when to perform an operation on a computing device or managed node 116. A management agent 118 may determine 556 whether to override evaluating defer criteria. For example, computer support personnel may use the user interface 106 to instruct the management agent 118 to perform a maintenance operation regardless of whether any defer criteria would be met. If the management agent 118 determines 556 to override any defer evaluation, then the management agent 118 may perform 554 the maintenance operation and/or report 554 to the administrative system 102 that the maintenance operation was performed 554. If the management agent 118 determines 556 not to override evaluating defer criteria, the management agent 118 may determine 558 whether any defer criteria associated with the lists 220, 222, 224 or other configurable option(s) 226 in the deferral configuration 312 is met for any of the process or application names on the list(s) 220, 222, 224 or in other configurable option(s) 226. For example, the management agent 118 may determine whether a named process or application is running and whether any defer criteria is met for that named process or application. If there has been no deferral configuration 312 set, the managed node 116 may proceed to perform 554 the maintenance operation.

If any defer criterion is met for any of the process or application names on the list(s) 220, 222, 224 or other option(s) 226; the management agent 118 may defer 552 performing the maintenance operation and/or report 552 to the administrative system 102 that the maintenance operation was not performed. The management agent 118 may also report 552 to the administrative system 102 the reason(s) why the maintenance operation was not performed. If none of the defer criteria are met for any of the process or application names on the list(s) 220, 222, 224 or other configurable option(s) 226; then the management agent 118 may perform 554 the maintenance operation and/or report 554 to the administrative system 102.

Thus, the systems and methods disclosed herein may allow automatic deferral of a maintenance operation. For example, this may be accomplished by comparing running processes, foreground windows and maximized windows to a predefined list of applications 220, 222, 224, 226 that should not be interrupted. While a user of the managed node 116 could be prompted (e.g., asked whether it is a good time to repair or reboot), it may be desirable instead to automatically detect whether it is an opportune time to repair or reboot. In this way, the user of a managed node 116 would not be interrupted at all (e.g., with a prompt) when using the managed node 116 in a particular way.

Figure 6:
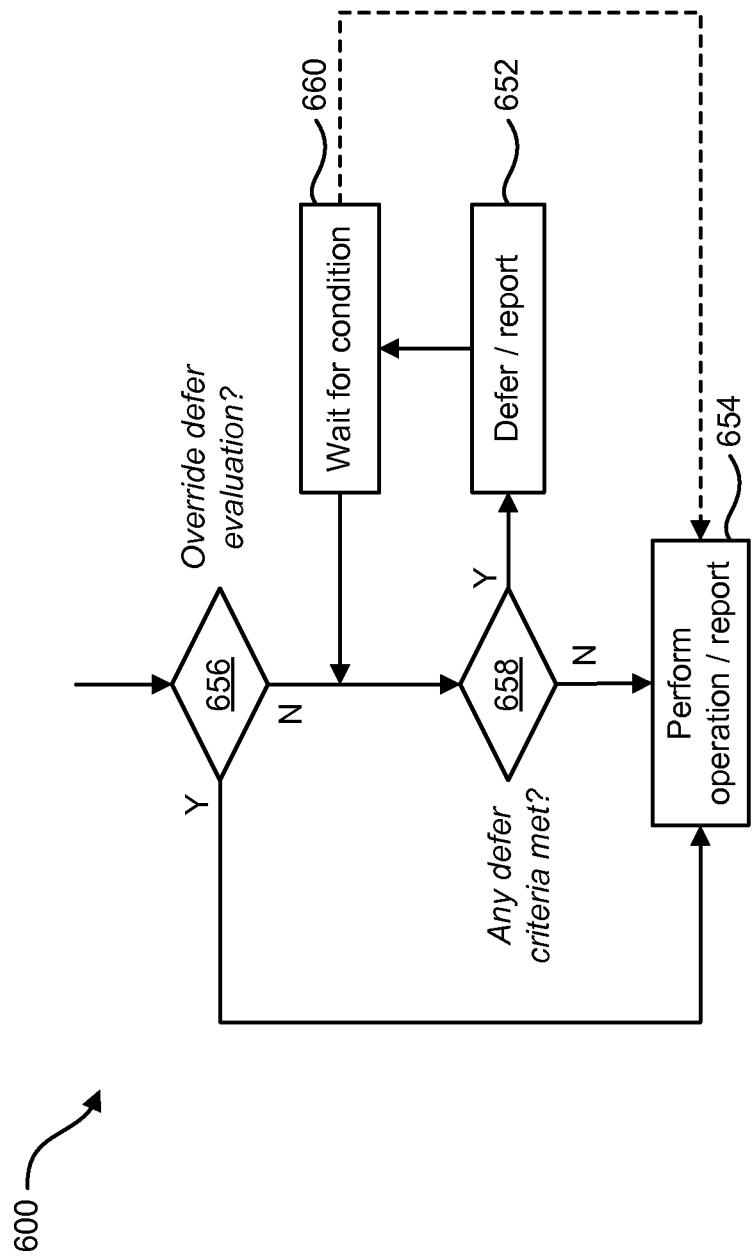
FIG. 6 is a flow diagram that illustrates another configuration of a method to determine when to perform an operation on a computing device or managed node.

FIG. 6 is a flow diagram that illustrates another configuration of a method 600 to determine when to perform an operation on a computing device or managed node 116. A management agent 118 may determine 656 whether to override evaluating defer criteria. For example, computer support personnel may use the user interface 106 to instruct the management agent 118 to perform a maintenance operation regardless of whether any defer criteria would be met. If the management agent 118 decides 656 to override any defer evaluation, then the management agent 118 may perform 654 the maintenance operation and/or report 654 to the administrative system 102 that the maintenance operation was performed 654. For example, the management agent 118 may have a default deferral configuration 312 (e.g., associated with the management agent 118 at deployment time). This default deferral configuration 312 may be used unless the management agent 118 is given another deferral configuration 312 at the time of a maintenance operation (e.g., repair task). In the case of a "high priority" maintenance operation, for example, the management agent 118 may be given a different deferral configuration 312 that does not offer any deferral options. If the management agent 118 determines not to override any defer evaluation, the management agent 118 may determine 658 whether any of the defer criteria is met for any application or process name or other option(s) in the deferral configuration 312. If no defer criterion is met for any application or process name or other option(s) in the deferral configuration 312, the management agent 118 may perform 654 the maintenance operation and/or report 654 to the administrative system 102. If a defer criterion is met for any application or process name or other option(s) in the deferral configuration 312, the management agent 118 may defer 652 performing the maintenance operation and/or report 652 to the administrative system 102 that performing the maintenance operation has been deferred and the reason(s) therefor.

The management agent 118 may wait 660 for a condition to occur before attempting to perform the maintenance operation again. For example, if the reason for deferring performance of a maintenance operation was that an important financial application was running on the managed node 116, then the management agent may periodically determine 658 whether any defer criteria are met. The management agent 118 may thus effectively defer performing a maintenance operation at least until the important financial application is no longer running on the managed node 116. Optionally, the management agent may periodically check 660 to determine whether the machine was in a low use state such as when the managed node 116 was logged off, locked or in a screen saver. At that point, the management agent 118 may perform 654 the maintenance operation and/or report 654 regardless of whether the important financial application is still running on the managed node 116. Optionally, the management agent 118 may simply wait 660 for a specified time to expire, and then perform 654 the maintenance operation and/or report 654 to the administrative system 102 that the maintenance operation has been performed.

Figure 7:
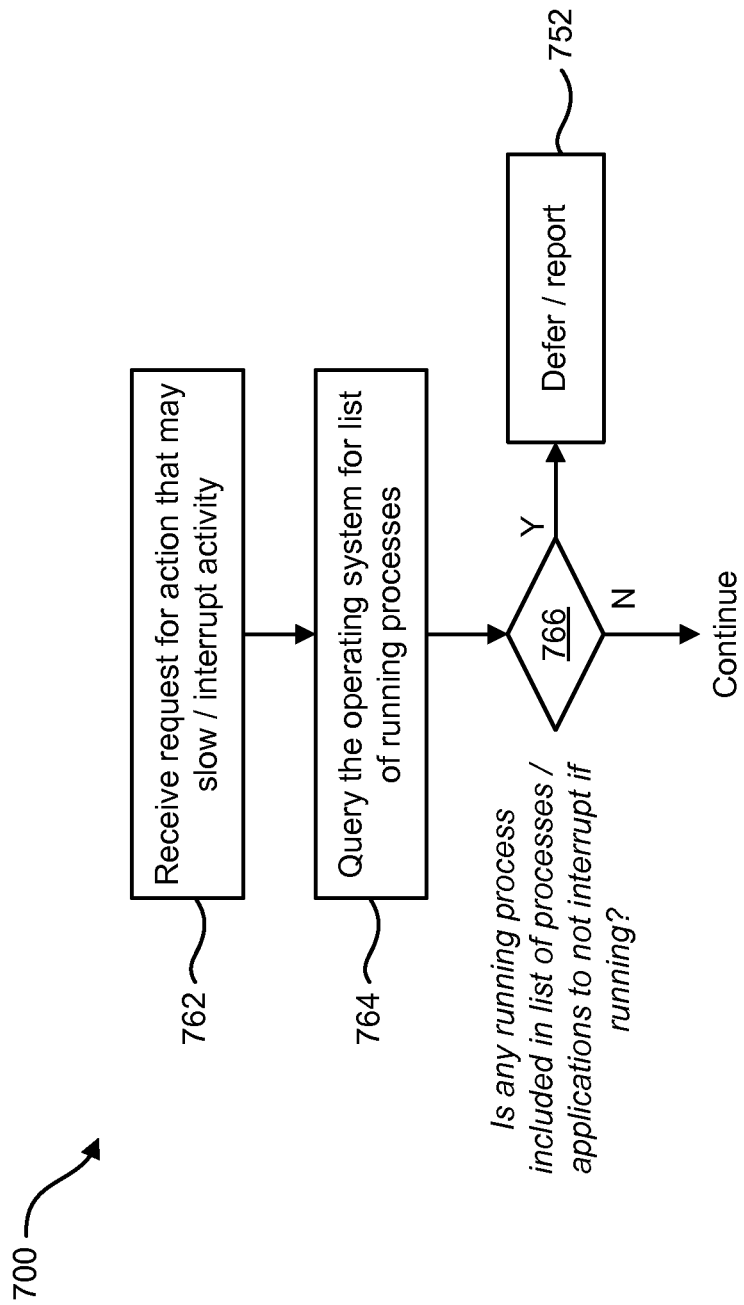
FIG. 7 is a flow diagram that illustrates another configuration of a method for determining when to perform an operation on a computing device or managed node.

FIG. 7 is a flow diagram that illustrates another configuration of a method 700 for determining when to perform an operation on a computing device or managed node 116. A management agent 118 may receive 762 a request to perform a maintenance operation that may slow or interrupt the activities occurring on the managed node 116, which may in turn interrupt the user of the managed node 116. The management agent 118 may query 764 the operating system of the managed node 116 for a list of applications or processes running on the managed node. The management agent 118 may determine 766 whether any of the applications or processes identified in the list provided by the operating system is included in the list of application or process names 220 associated with criteria to defer performing a maintenance operation when any of the applications or processes identified in the list 220 is running on the managed node 116. If so, then the management agent 118 may defer 752 performing the maintenance operation and/or report 752 to the administrative system 102 that maintenance has been deferred and any reason(s) for deferring. Otherwise, the management agent 118 may perform the maintenance operation or continue to determine whether any other defer criteria are met.

Figure 8:
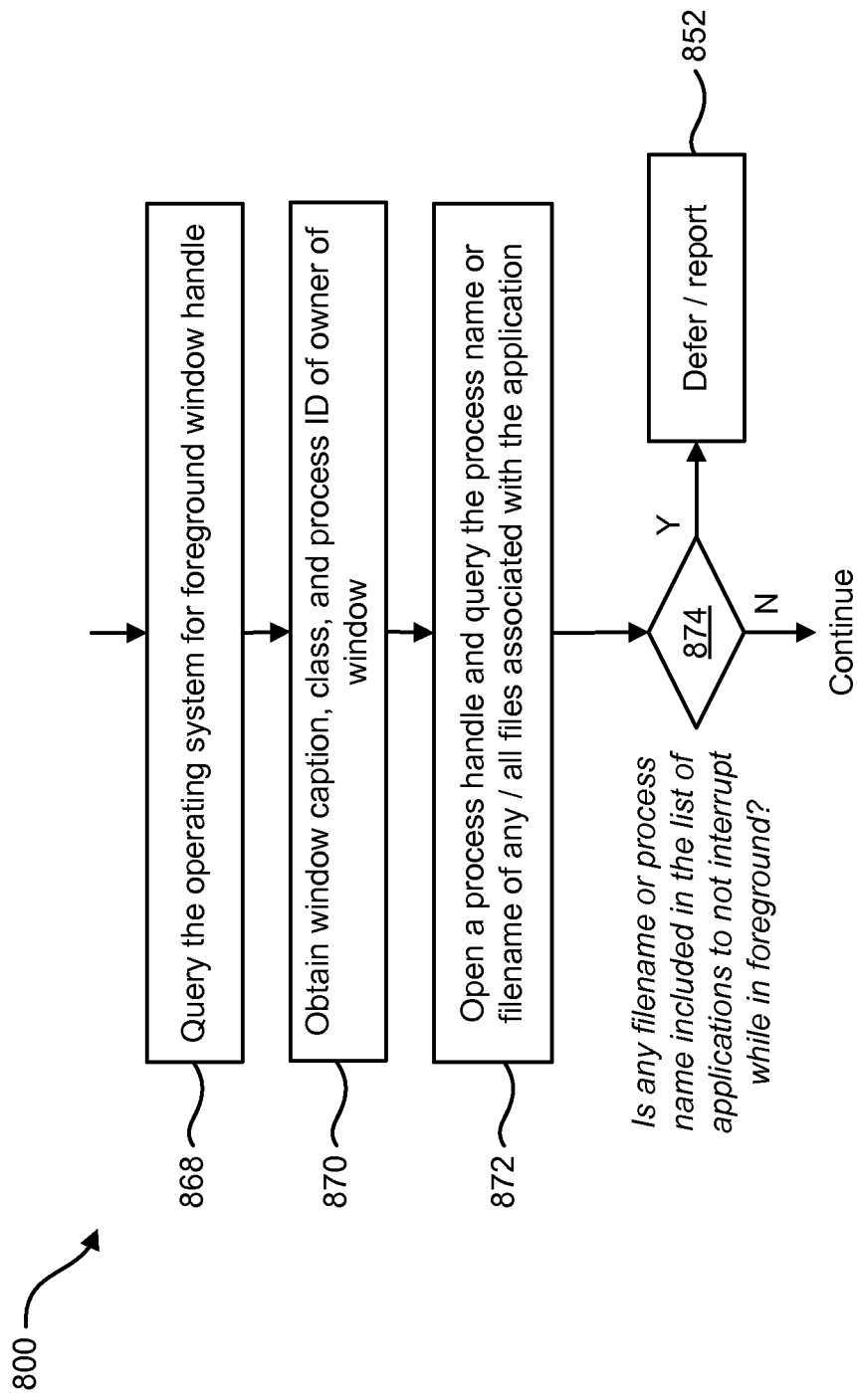
FIG. 8 is a flow diagram that illustrates another configuration of a method for determining when to perform an operation on a computing device or managed node.

FIG. 8 is a flow diagram that illustrates another configuration of a method 800 for determining when to perform an operation on a computing device or managed node 116. A management agent 118 may query 868 the operating system on the managed node 116 for the identification of any user interface that is in the foreground of the display 332. This identification may be a window handle that identifies the user interface. The management agent 118 may then obtain 870 the user interface's caption, class, and process identification (ID) of the owner of the user interface. The management agent 118 may use the process ID to open 872 a process handle and query the process name or filename of any or all files associated with the application. In one configuration, the management agent 118 may use a standard Microsoft® Windows platform software development kit (SDK) application programming interface (API) to determine which files are associated with a particular process (e.g., for comparison against a deferral list 220, 222, 224, 226) and, for example, whether that process "owns" any visible windows on the managed node 116. Still other APIs may be available for the management agent 118 to discover which windows are visible on the desktop, which one is "active" (e.g., in the foreground) and how much surface each window covers (e.g., including whether they have the "maximized" or "topmost" bits set). The management agent 118 may determine 874 whether any of the filenames (e.g., filenames may be included in the process' information) are included in the list of application or process names 222 associated with a criterion to defer performing a maintenance operation when the listed application or process names owns a user interface in the foreground of the display 332. If there are, the management agent 118 may defer 852 performing the maintenance operation and/or report 852 to the administrative system 102 that maintenance has been deferred and any reason(s) for deferring. Otherwise, the management agent 118 may perform the maintenance operation or continue to determine whether any other defer criteria are met. Alternatively, the management agent 118 may determine 874 whether any of the applications or processes named in the list 222 own a user interface that is in a "FOCUSED" state.

Figure 9:
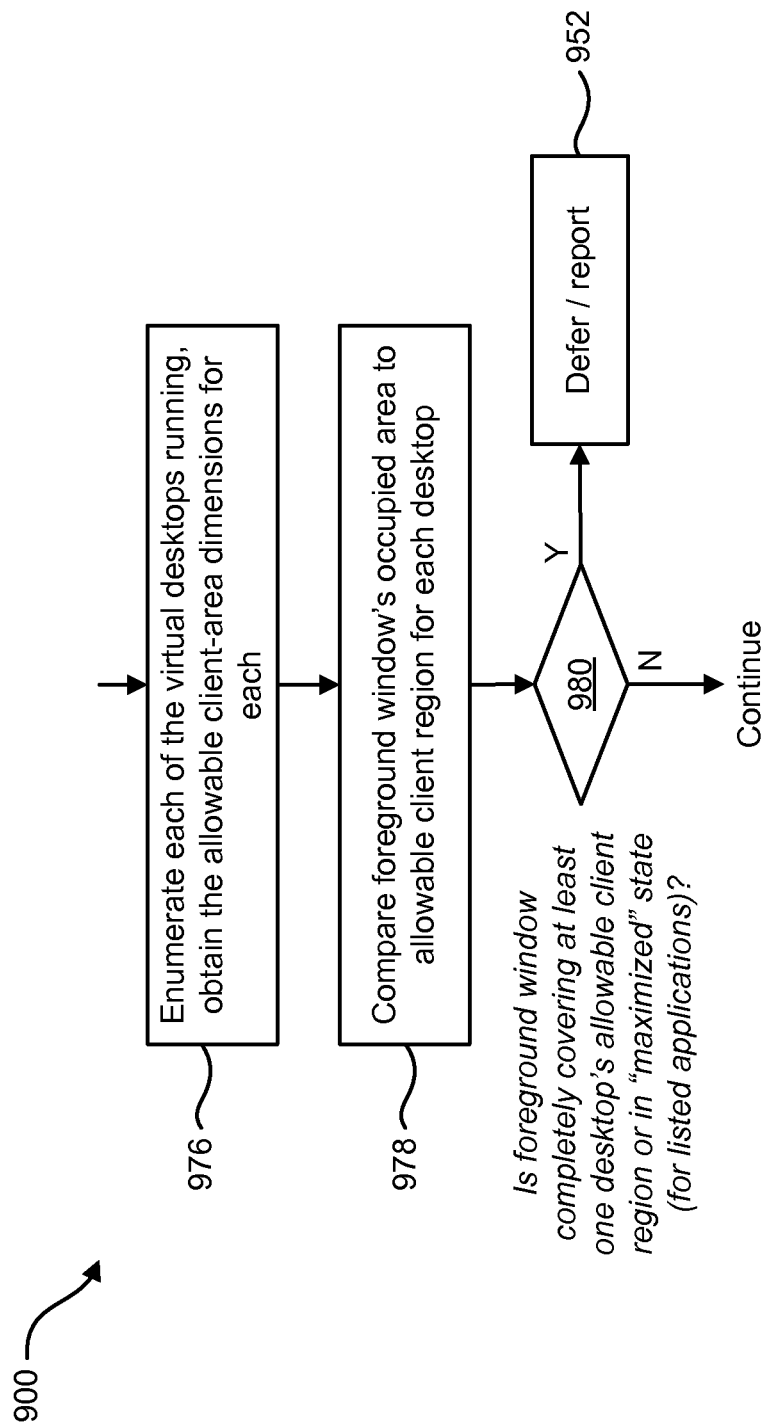
FIG. 9 is a flow diagram that illustrates another configuration of a method for determining when to perform an operation on a computing device or managed node.

FIG. 9 is a flow diagram that illustrates another configuration of a method 900 for determining when to perform an operation on a computing device or managed node 116. A management agent 118 may enumerate 976 each of the virtual desktops 334 running on the managed node 116 and may obtain 976 the allowable client-area dimensions for each. The windows of different applications or processes may have different manners of appearing to be "full screen." Thus, a simple comparison of the visible area of a window to the area of a corresponding virtual desktop may be beneficial. For example, a Windows® desktop 334 may not allow a "maximized" user interface to use the entire display 332 area, but rather may preserve a portion of the display 332 area in order to display a "taskbar" or "start bar." Thus, the management agent 118 may obtain 976 the display 332 dimensions less the area used to display a taskbar for each running virtual desktop 334. The management agent 118 may then compare 978 the foreground user interface's occupied area to the allowable client area for each virtual desktop 334.

The management agent 118 may determine 980 a first condition whether any of the foreground user interfaces covers at least the allowable client area for its corresponding virtual desktop 334 (e.g., is "maximized"). Alternatively, the management agent may determine 980 whether any of the foreground user interfaces are in a "MAXIMIZED" state. Either approach may be useful, but it should be noted that some applications may not use the "MAXIMIZED" state when running in a full-screen mode such as Microsoft® Internet Explorer®, for example. The management agent may also determine 980 a second condition whether any of the "maximized" user interfaces belongs to an application or process whose name is included in the list 224 associated with criteria to defer performing a maintenance operation when any of those identified applications or processes own a user interface that is both in the foreground and "maximized" on one of the virtual desktops. If both conditions are met, then the management agent 118 may defer 952 performing the maintenance operation and/or report 952 to the administrative system 102 that maintenance has been deferred and any reason(s) for deferring. Otherwise, the management agent 118 may perform the maintenance operation or continue to determine whether any other defer criterion is met.

Figure 10:
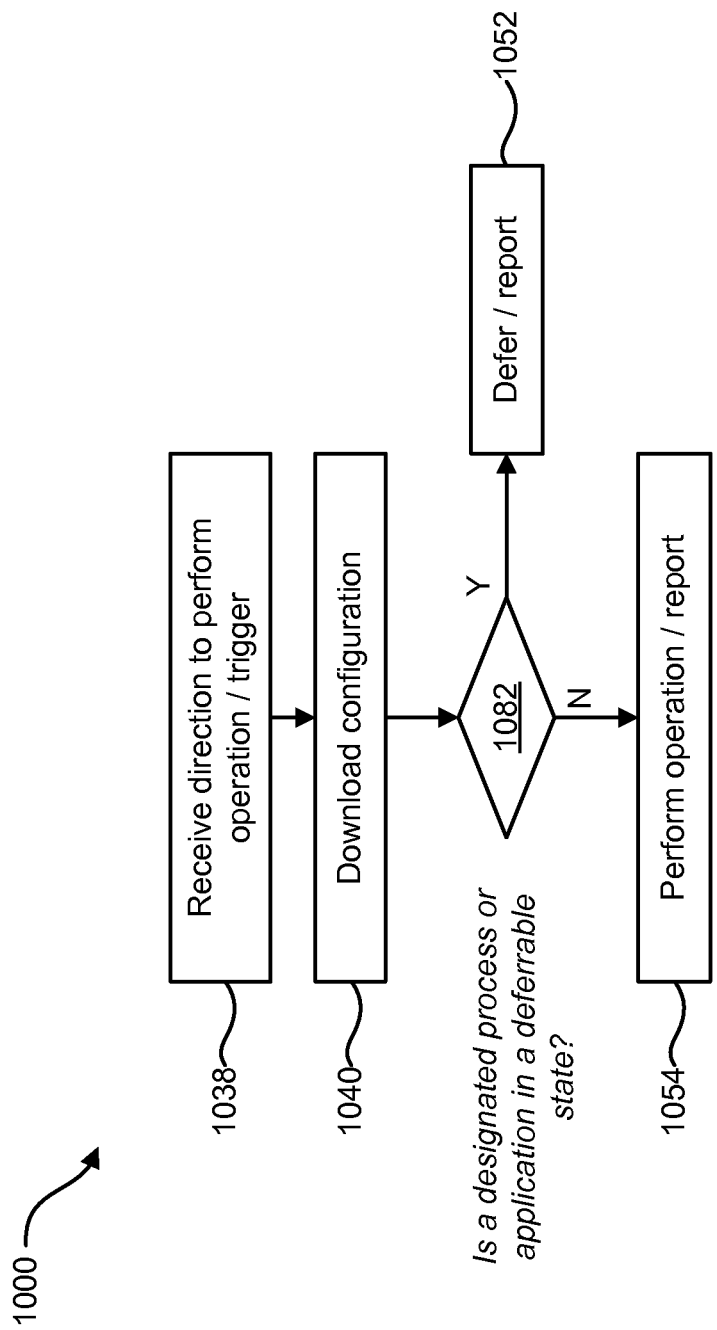
FIG. 10 is a flow diagram that illustrates another configuration of a method for determining when to perform an operation on a computing device or managed node.

FIG. 10 is a flow diagram that illustrates another configuration of a method 1000 for determining when to perform an operation on a computing device or managed node 116. A management agent 118 may receive 1038 a direction to perform an operation or a trigger may occur 1038. A deferral configuration may be downloaded 1040. In one example, the management agent 118 attempts to scan the managed node 116 and downloads 1040 a deferral configuration 112. A management agent 118 may determine 1082 whether the managed node 116 or any designated application or process is in a deferrable state. For example, if an application or process named in a list associated with configurable option 226 is associated with criteria to defer performing a maintenance operation if the application or process is using the DVD drive on a managed node 116 and the named application or process is using the DVD drive, the management agent 118 may defer 1052 performing the maintenance operation and/or report to the administrative system 102 that maintenance has been deferred and any reason(s) for deferring. Otherwise, the management agent 118 may perform 1054 the maintenance operation or continue to determine whether any other defer criterion is met. Another example of possible defer criteria may be whether a particular application is using a specified amount of CPU resources. Another example may be whether the managed node is using a specified amount of CPU resources regardless of whether a particular application or process is named. Another example may be whether a particular application or process owns a user interface with the "TOPMOST" property that returns true. Another example is whether a particular application or process has loaded a particular ActiveX® control. Yet another example is whether or not the managed node 116 is on Alternating Current (AC) power or battery power. Other examples may include whether a particular application is using a particular hardware device, such as an optical drive (CD, DVD, Blu-Ray®, etc.), a USB drive, etc.

Figure 11:
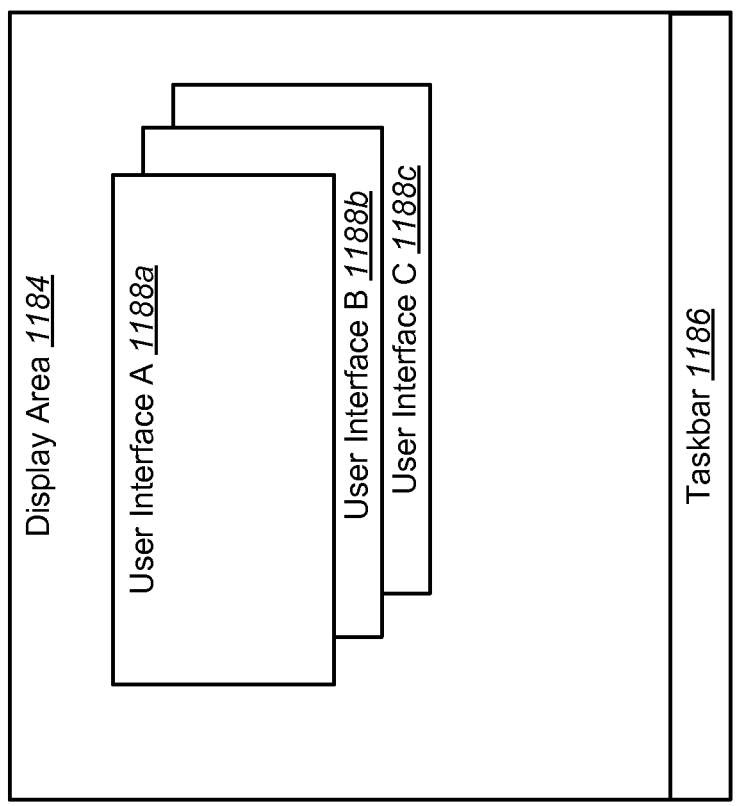
FIG. 11 is a block diagram illustrating a display area.

FIG. 11 is a block diagram illustrating a display area 1184. A managed node 116 may include a display 332. The display 332 may include a display area 1184. The display area 1184 may display an operating system desktop or interface. The display area 1184 may display several user interface windows 1188a-c. The display area 1184 may also display a taskbar 1186. One or more user interface windows 1188a may be in the foreground of the display area 1184. When a user interface 1188a is in the foreground of the display area, it may "cover" other user interfaces 1188b, 1188c that occupy part of the same display area. The user interface window 1188a in the foreground may also be in a "FOCUSED" state, which may mean that a user has interacted with that user interface 1188a more recently than other user interfaces 1188b, 1188c. A list of application or process names 222 may be associated with criteria to defer performing a maintenance operation on a managed node 316 when an application or process owns the foreground user interface 1188a and is identified in the list 222. However, if an identified application or process owns a user interface that is not in the foreground 1188b, 1188c, the same criteria may not require deferring performing a maintenance operation.

Figure 12:
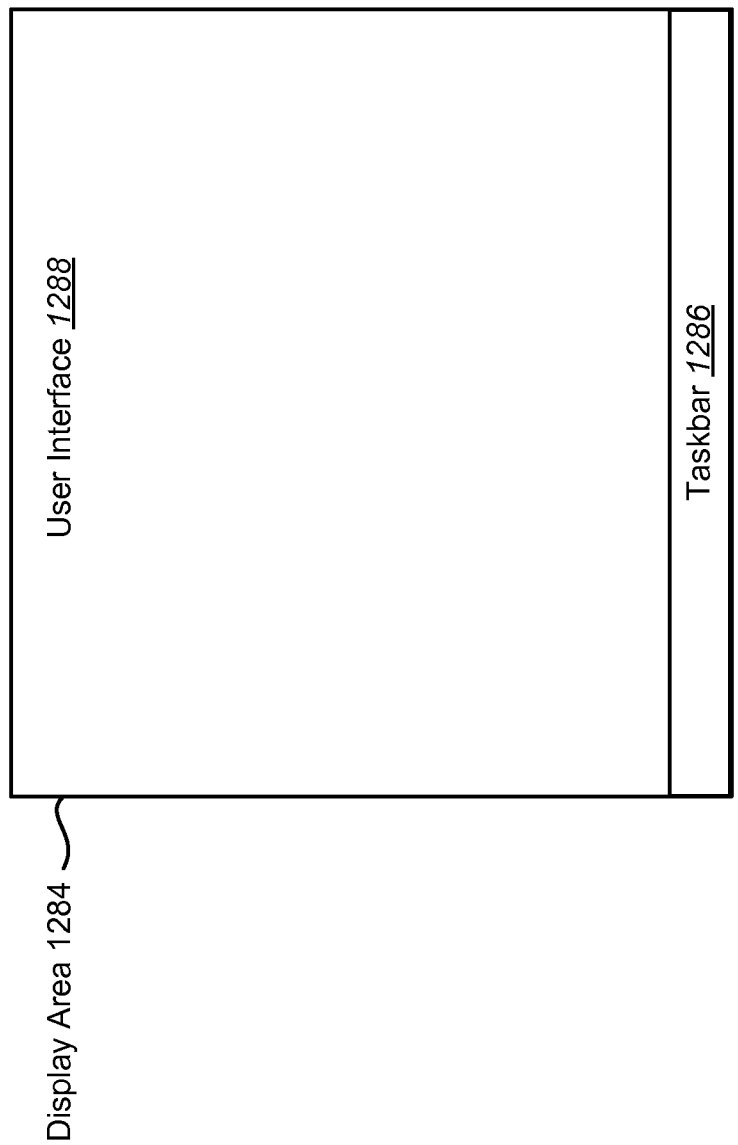
FIG. 12 is a block diagram illustrating a display area including a user interface.

FIG. 12 is a block diagram illustrating a display area including a user interface. A managed node 116 may include a display, which may include a display area 1284, which may display an operating system desktop or interface, a user interface 1288, and a taskbar 1286. In some cases, a single user interface 1288 may be in the foreground and occupy the entire allowable client area in the display area 1284. The allowable client area may include the entire display area less a taskbar 1286. When a user interface window 1288 is in the foreground and occupies at least the entire allowable client area, it may be deemed to be maximized or in a "presentation mode." A list of application or process names 224 may be associated with criteria to defer performing a maintenance operation on a managed node 316 when an application or process owns a foreground user interface 1288 that occupies at least the entire allowable client area and is identified in the list 224. However, if an identified application or process owns a user interface 1288 that is not in the foreground or does not occupy at least the entire allowable client area, the same criteria may not require deferring performing a maintenance operation.

Figure 13:
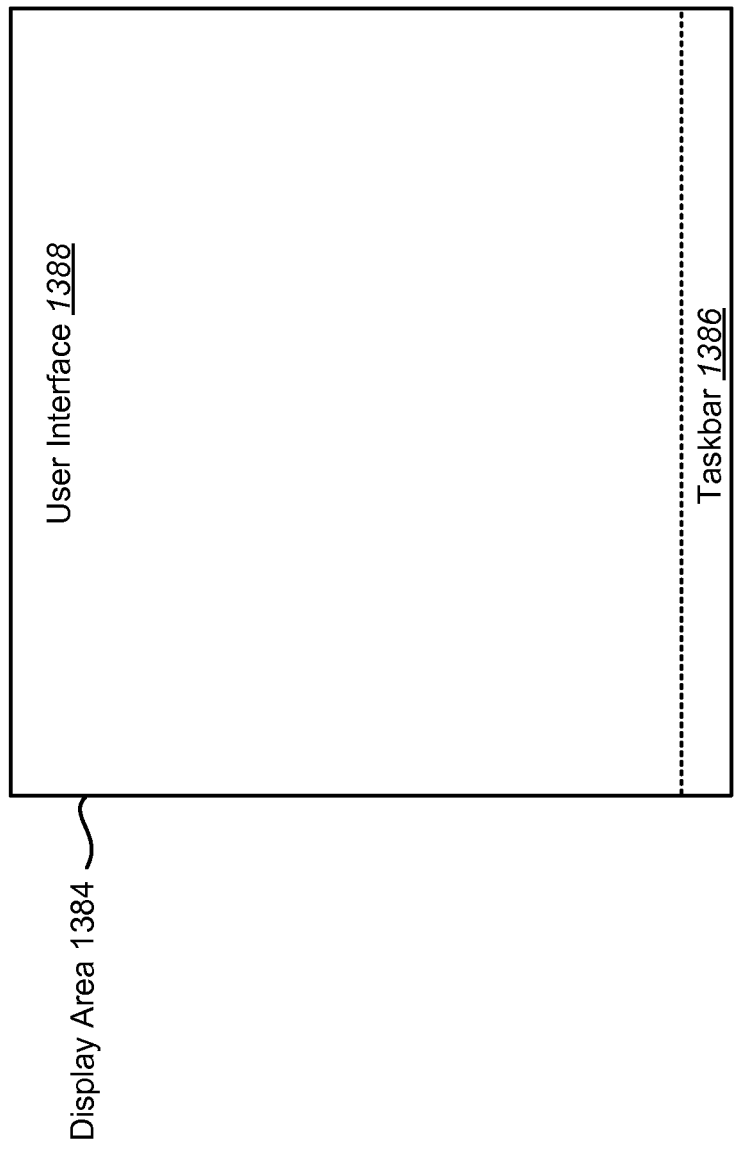
FIG. 13 is a block diagram illustrating a display area including a user interface.

FIG. 13 is a block diagram illustrating a display area including a user interface 1388. A managed node 116 may include a display, which may include a display area 1384, which may display an operating system desktop or interface, a user interface 1388, and a taskbar 1386. In some cases, a user interface 1388 may be in the foreground and occupy the entire display area 1384. In this case, the user interface 1388 may "cover" the taskbar 1386. Alternatively, the taskbar may be made to appear semitransparent such that both the user interface 1388 and the taskbar 1386 may be viewed at the same time. When a single user interface 1388 is in the foreground and occupies the entire display area, it may be deemed to be in a "presentation mode." A list of application or process names 224 may be associated with criteria to defer performing a maintenance operation on a managed node 316 when an application or process owns a foreground user interface 1388 that occupies at least the entire allowable client area and is identified in the list 224. These criteria may function for both the case illustrated in FIG. 12 and the case illustrated in FIG. 13, since the user interface 1388 occupies more than the "allowable client area." For example, PowerPoint® may occupy more than the "allowable client area" when it is in a "presentation mode." However, if an identified application or process owns a user interface 1388 that is not in the foreground or does not occupy at least the entire allowable client area, the same criteria may not require deferring performing a maintenance operation.

Figure 14:
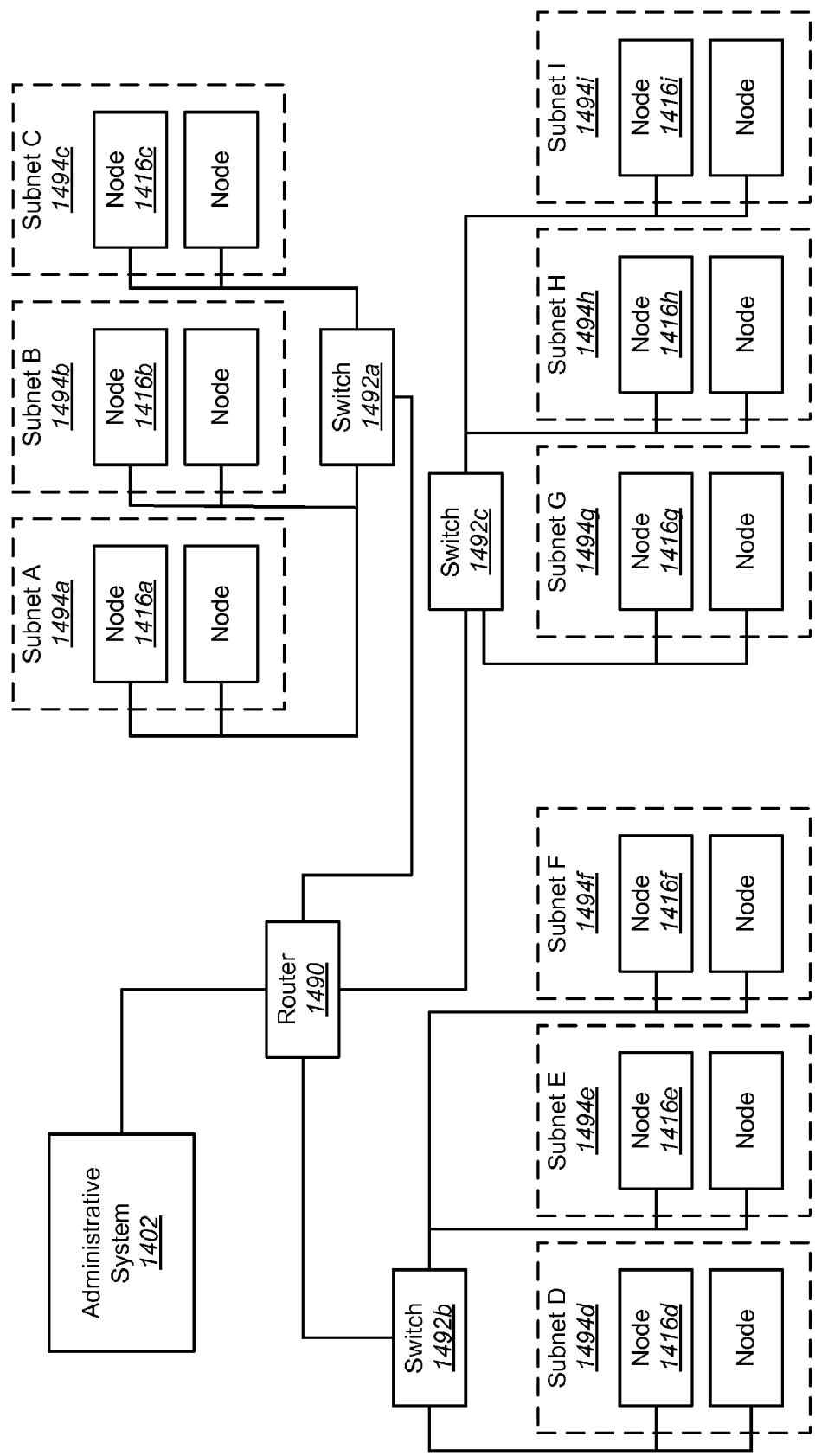
FIG. 14 is a block diagram that illustrates one configuration of a network where a system for determining when to perform an operation on a computing device may be implemented.

FIG. 14 is a block diagram that illustrates one configuration of a network where a system for determining when to perform an operation on a computing device may be implemented. An administrative system 1402 is connected to a router 1490. The router 1490 is connected to switches 1492a, 1492b, 1492c. The switch 1492a is connected to several nodes 1416a, 1416b, 1416c, etc. via their respective subnets 1494a, 1494b, 1494c. The switch 1492b is connected to several nodes 1416d, 1416e, 1416f, etc. via their respective subnets 1494d, 1494e, 1494f. The switch 1492c is connected to several nodes 1416g, 1416h, 1416i, etc. via their respective subnets 1494g, 1494h, 1494i. Although FIG. 14 only shows one router 1490, and a limited number of switches 1492, subnets 1494, and nodes 1416, many and varied numbers of routers 1490, switches 1492, subnets 1494, and nodes 1416 may be included in networks and/or systems where a system for determining when to perform an operation may be implemented.

Figure 15:
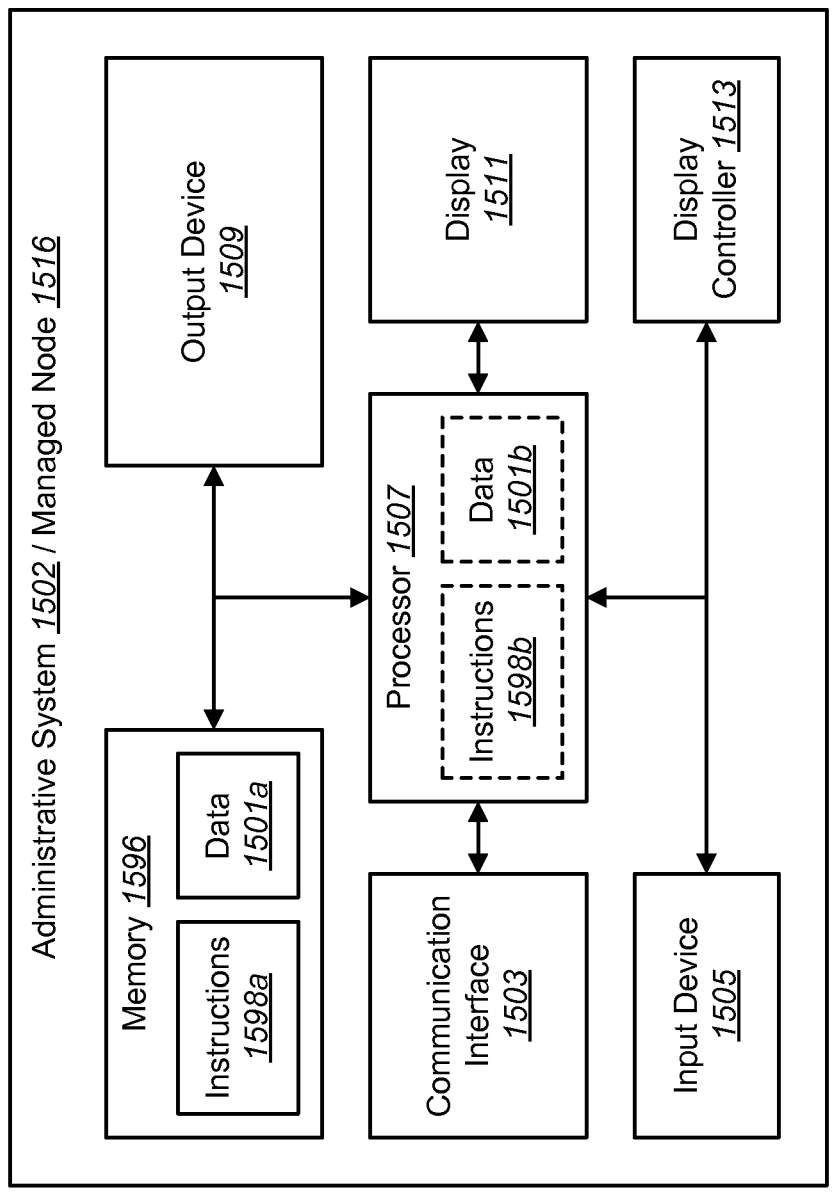
FIG. 15 illustrates various components of a computing device.

FIG. 15 illustrates various components that may be utilized in an administrative system 1502 and/or a managed node 1516. The illustrated components may be located within the same physical structure or in separate housings or structures.

The administrative system 1502 and/or managed node 1516 may include a processor 1507 and memory 1596. The memory 1596 may include instructions 1598a and data 1501a. The processor 1507 controls the operation of the administrative system 1502 and/or managed node 1516 and may be, for example, a microprocessor, a microcontroller, a digital signal processor (DSP) or other device known in the art. The processor 1507 typically performs logical and arithmetic operations based on program instructions 1598b and/or data 1501b it loads from the memory 1596.

The administrative system 1502 and/or managed node 1516 typically may include one or more communication interfaces 1503 for communicating with other electronic devices. The communication interfaces 1503 may be based on wired communication technology, wireless communication technology, or both. Examples of different types of communication interfaces 1503 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The administrative system 1502 and/or managed node 1516 typically may include one or more input devices 1505 and one or more output devices 1509. Examples of different kinds of input devices 1505 include a keyboard, mouse, microphone, remote control device, button, joystick, trackball, touchpad, lightpen, etc. Examples of different kinds of output devices 1509 include a speaker, printer, etc. One specific type of output device which may be typically included in a computer system is a display device 1511. Display devices 1511 used with configurations disclosed herein may utilize any suitable image projection technology, such as a cathode ray tube (CRT), liquid crystal display (LCD), light-emitting diode (LED), gas plasma, electroluminescence, or the like. A display controller 1513 may also be provided, for converting data 1501*a* stored in the memory 1596 into text, graphics, and/or moving images (as appropriate) shown on the display device 1511.

Of course, FIG. 15 illustrates only one possible configuration of an administrative system 1502 and/or managed node 1516. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for determining when to perform an operation on a computing device, comprising:
   receiving, at a computing device, a direction to perform an operation on the computing device, wherein the direction is received from an administrative system through a computer network;
   receiving, at the computing device, a deferral configuration that includes multiple criteria, wherein the multiple criteria comprise (a) a name of a running process or application, wherein the running process or the application has a foreground user interface window that occupies at least an entire allowable client area, (b) the process or application is using a specified hardware device, (c) the process or application is using a specified amount of CPU resources, and (d) the foreground user interface window includes a specified caption, and wherein the deferral configuration is received from the administrative system through the computer network;
   determining, on the computing device, whether the multiple criteria are met;
   deferring, on the computing device, performance of the operation if the multiple criteria are met; and
   performing, on the computing device, the operation if the multiple criteria are not met, wherein the operation is a maintenance operation.

2. The method of claim 1, wherein:
the deferral configuration is configurable to add or delete process or application names; and
wherein the deferral configuration is configurable to add or delete one or more criteria.

3. The method of claim 1, wherein the multiple criteria further comprise:
the foreground user interface window occupies at least an entire allowable client area on at least one virtual desktop.

4. The method of claim 1, wherein the multiple criteria further comprise:
a process or application is associated with a user interface window that has a property indicating that the user interface window is maximized.

5. The method of claim 1, wherein the multiple criteria further comprise:
a process or application has loaded a specified software control.

6. A computing device that is configured for determining when to perform an operation on a computing device, comprising:
a processor;
memory in electronic communication with the processor;
instructions stored in the memory, the instructions being executed to:
receive, at a computing device, a direction to perform an operation, wherein the direction is received from an administrative system through a computer network;
receive, at the computing device, a deferral configuration that includes multiple criteria wherein the multiple criteria comprise (a) a name of a running process or application, wherein the running process or the application has a foreground user interface window that occupies at least an entire allowable client area, (b) the process or application is using a specified hardware device, (c) the process or application is using a specified amount of CPU resources, and (d) the foreground user interface window includes a specified caption, and wherein the deferral configuration is received from the administrative system through the computer network;
determine, on the computing device, whether the multiple criteria are met;
defer, on the computing device, performance of the operation if the multiple criteria are met; and
perform, on the computing device, the operation if the multiple criteria are not met, wherein the operation is a maintenance operation.

7. The computing device of claim 6, wherein:
the deferral configuration is configurable to add or delete process or application names; and
wherein the deferral configuration is configurable to add or delete one or more criteria.

8. The computing device of claim 6, wherein the multiple criteria further comprise:
the foreground user interface window occupies at least an entire allowable client area on at least one virtual desktop.

9. The computing device of claim 6, wherein the multiple criteria further comprise:
a process or application is associated with a user interface window that has a property indicating that the user interface window is maximized.

10. The computing device of claim 6, wherein the multiple criteria further comprise:
a process or application has loaded a specified software control.

11. A non-transitory computer-readable medium for determining when to perform an operation comprising executable instructions that when executed performs the operation of:
receiving, at a computing device, a direction to perform an operation, wherein the direction is received from an administrative system through a computer network;
receiving, at the computing device, a deferral configuration that includes multiple criteria, wherein the multiple criteria comprise (a) a name of a running process or application, wherein the running process or the application has a foreground user interface window that occupies at least an entire allowable client area, (b) the process or application is using a specified hardware device, (c) the process or application is using a specified amount of CPU resources, and (d) the foreground user interface window includes a specified caption, and wherein the deferral configuration is received from the administrative system through the computer network;
determining, on the computing device, whether the multiple criteria are met;
deferring, on the computing device, performance of the operation if the multiple criteria are met; and
performing, on the computing device, the operation if the multiple criteria are not met, wherein the operation is a maintenance operation.

* * * * *